(12) United States Patent
Hooli et al.

(10) Patent No.: US 10,009,811 B2
(45) Date of Patent: Jun. 26, 2018

(54) LAYERED MOBILITY

(71) Applicant: Nokia Solutions and Networks Oy, Espoo (FI)

(72) Inventors: Kari Juhani Hooli, Oulu (FI); Mika Petri Olavi Rinne, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 184 days.

(21) Appl. No.: 14/896,935

(22) PCT Filed: Jun. 11, 2013

(86) PCT No.: PCT/EP2013/061986
§ 371 (c)(1),
(2) Date: Dec. 9, 2015

(87) PCT Pub. No.: WO2014/198295
PCT Pub. Date: Dec. 18, 2014

(65) Prior Publication Data
US 2016/0192254 A1    Jun. 30, 2016

(51) Int. Cl.
*H04W 36/04* (2009.01)
*H04W 72/12* (2009.01)
*H04W 36/00* (2009.01)

(52) U.S. Cl.
CPC ....... *H04W 36/04* (2013.01); *H04W 36/0055* (2013.01)

(58) Field of Classification Search
CPC ......... H04W 36/0005; H04W 36/0072; H04W 36/0083; H04W 36/04; H04W 36/38; H04W 72/1278; H04W 72/1284; H04W 72/1289
See application file for complete search history.

(56) References Cited

U.S. PATENT DOCUMENTS

2014/0092785 A1* 4/2014 Song ................. H04L 1/00
                                                     370/280
2014/0177560 A1* 6/2014 Guo ................. H04W 72/1268
                                                     370/329

(Continued)

FOREIGN PATENT DOCUMENTS

KR   20110120216 A    11/2011
WO   WO 2008/038093 A2    4/2008

(Continued)

OTHER PUBLICATIONS

3GPP TSG-RAN WG2 Meeting #82 *MAC and PHY Modifications Required for Dual Connectivity Support* Alcatel-Lucent Shanghai Bell; Fukuoka, Japan, May 20-24, 2013, R2-131964.

(Continued)

*Primary Examiner* — Scott M Sciacca
(74) *Attorney, Agent, or Firm* — Harrington & Smith

(57) ABSTRACT

Apparatuses and methods for providing layered mobility are provided. Small cell eNBs belong to a cluster of local area base stations. A source eNB has a connection with user equipment having a first identity related to the connection and receives from the user equipment a request to send a scheduling request to another local area eNB of the cluster, the request including a list of target candidate eNBs. The source eNB determines suitable target eNB(s) from the list and resources for sending a scheduling request; and transmits The target eNB receives a scheduling request from user equipment allocates and sends communication resources to the user equipment and associates the first identity to the connection with the user equipment.

17 Claims, 4 Drawing Sheets

(56) References Cited

U.S. PATENT DOCUMENTS

| | | | | |
|---|---|---|---|---|
| 2014/0302845 | A1* | 10/2014 | Kim | H04W 48/16 455/434 |
| 2014/0355562 | A1* | 12/2014 | Gao | H04W 76/025 370/331 |
| 2016/0021581 | A1* | 1/2016 | Deenoo | H04W 36/0055 370/331 |
| 2016/0050054 | A1* | 2/2016 | Wager | H04L 5/0035 455/450 |
| 2016/0073427 | A1* | 3/2016 | Worrall | H04W 28/0278 370/329 |

FOREIGN PATENT DOCUMENTS

| | | |
|---|---|---|
| WO | WO 2013/023681 A1 | 2/2013 |
| WO | WO 2014/067567 A1 | 5/2014 |

OTHER PUBLICATIONS

3GPP TSG-RAN WG2 Meeting #81bis *Study of Solutions and Radio Protocol Architecture for Dual-Connectivity* Huawei, HiSilicon; Chicago, USA, Apr. 15-19, 2013, R2-131164.

3GPP TSG-RAN WG1 Meeting #70, Qingdao, China, Aug. 13-17, 2012, R1-123406, "PUCCH enhancements for UL CoMP", InterDigital Communications, LLC, 3 pgs.

3GPP TSG-RAN WG2 #81, Malta, MT, Jan. 28-Feb. 1, 2013, Tdoc R2-130515, "Dual Connectivity for Small Cell Deployments" InterDigial Communications, 4 pgs.

3GPP TSG-RAN WG2#81bis, Chicago, USA, Apr. 15-19, 2013, R2-131202, "Minimising Signalling load for Small cell scenarios", Sharp, 4 pgs.

3GPP TSG-RAN WG3 Meeting #74, San Francisco, USA, Nov. 14-18, 2011, R3-112870, "U-RNTI management by the HNB-GW", Nokia Siemens Networks, 6 pgs.

* cited by examiner

LAYERED MOBILITY

FIELD

The exemplary and non-limiting embodiments of the invention relate generally to wireless communication systems. Embodiments of the invention relate especially to apparatuses, methods, and computer program products in communication networks.

BACKGROUND

The following description of background art may include insights, discoveries, understandings or disclosures, or associations together with disclosures not known to the relevant art prior to the present invention but provided by the invention. Some of such contributions of the invention may be specifically pointed out below, whereas other such contributions of the invention will be apparent from their context.

Wireless communication systems are constantly under development. Developing systems provide a cost-effective support of high data rates and efficient resource utilization. One communication system under development is the 3rd Generation Partnership Project (3GPP) Long Term Evolution (LTE) later also known as LTE-Advanced (LTE-A). The LTE is designed to support various services, such as high-speed data, multimedia unicast and multimedia broadcast services.

One aspect under development is the concept of small cells. It has been proposed that under a macro cell serving a large area there would be a small cell layer or a number of smaller cells with local area coverage. The small cells could reduce power consumption of the base stations and user equipment (UE), and they could be used to offload traffic from the macro cell layer to a small cell layer, and also potentially enable some new service types in the future.

It has been proposed that UE could have a dual-connectivity for the macro cell layer and for the small cell layer. The dual-connectivity may mean a logical relationship of the UE to the two different cell layers. The UE may have physical links established for the macro cell and small cell layers simultaneously, or the UE may switch the physical resources in time, or the UE may run its logical macro connection via the small cell. Collaborative transmissions on a small cell layer are not excluded.

SUMMARY

According to an aspect of the present invention, there is provided an apparatus, comprising at least one processor and at least one memory including computer program code. The at least one memory and the computer program code are configured to, with the at least one processor, cause the apparatus at least to: have a first connection with a base station serving a macro cell and a second connection with a first local area base station belonging local area base stations providing a small cell cluster; have a first identity related to the first connection and a second identity related to the second connection; transmit to the first local area base station a request for resources to send a scheduling request to another local area base station, wherein the request comprises a list of target candidates; receive from the first local area base station a response to the request, the response comprising one or more allowed targets from the list and information on resources for sending the scheduling request to at least an allowed target of the one or more targets; transmit the scheduling request to a second local area base station of the allowed targets, the transmitting using resources for the second local area base station indicated in the response; and communicate with the second local area base station and associate the second identity to the connection with the second local area base station.

According to an aspect of the present invention, there is provided an apparatus in a base station, comprising at least one processor and at least one memory including computer program code. The at least one memory and the computer program code are configured to, with the at least one processor, cause the apparatus at least to: belong to a cluster of local area base stations; have a connection with user equipment having a first identity related to the connection; receive from the user equipment a request to send a scheduling request to another local area base station of the cluster, the request comprising a list of target candidate base stations; determine one or more suitable target base stations from the list of target candidate base stations; determine resources for sending the scheduling request to the one or more suitable target base stations; transmit to the user equipment a response to the request, the response comprising the one or more suitable target base stations of the list as allowed targets and comprising indications of the resources.

According to an aspect of the present invention, there is provided an apparatus in a base station, comprising at least one processor and at least one memory including computer program code. The at least one memory and the computer program code are configured to, with the at least one processor, cause the apparatus at least to: belong to local area base stations providing a small cell cluster; determine, responsive to communication with another local area base station in the cluster, resources that can be used by a user equipment to communicate with the base station for a scheduling request and communicating indication of the determined resources to the other local area base station; receive a scheduling request from user equipment connected to the other local area base station belonging to the cluster, the connection being related to a given identity, the scheduling request from the user equipment using the determined resources previously communicated to the other local area base station; allocate communication resources to the user equipment; and start communicating with the user equipment and associating the given identity to the connection with the user equipment.

According to an aspect of the present invention, there is provided a method comprising: having a first connection with a base station serving a macro cell and a second connection with a first local area base station belonging to a cluster of local area base stations providing a small cell cluster; having a first identity related to the first connection and a second identity related to the second connection; transmitting to the first local area base station a request for resources to send a scheduling request to another local area base station, wherein the request comprises a list of target candidates; receiving from the first local area base station a response to the request, the response comprising one or more allowed targets from the list and information on resources for sending the scheduling request to at least an allowed target of the one or more targets; transmitting the scheduling request to a second local area base station of the allowed targets, the transmitting using resources for the second local area base station indicated in the response; and communicating with the second local area base station and associating the second identity to the connection with the second local area base station.

According to another aspect of the present invention, there is provided a method in a base station, comprising: belonging to a cluster of local area base stations; having a connection with user equipment having a first identity related to the connection; receiving from the user equipment a request to send a scheduling request to another local area base station of the cluster, the request comprising a list of target candidate base stations; determining one or more suitable target base stations from the list of target candidate base stations; determining resources for sending the scheduling request to the one or more suitable target base stations; and transmitting to the user equipment a response to the request, the response comprising the one or more suitable target base stations of the list as allowed targets and comprising indications of the resources.

According to yet another aspect of the present invention there is provided a method in a base station, comprising: belonging to a cluster of local area base stations; determining, responsive to communication with another local area base station in the cluster, resources that can be used by a user equipment to com- municate with the base station for a scheduling request and communicating indication of the determined resources to the other local area base station: receiving a schedul- ing request from user equipment connected to the other local area base station be- longing to the cluster, the connection being related to a given identity, the scheduling request from the user equipment using the determined resources previously commu- nicated to the other local area base station; allocating communication resources to the user equipment; and initializing communicating with the user equipment and associat- ing the given identity to the connection with the user equipment.

Some embodiments of the invention are defined in the dependent claims.

LIST OF DRAWINGS

Embodiments of the present invention are described below, by way of example only, with reference to the accompanying drawings, in which FIG. 1 illustrates an example of a communication environment;

DESCRIPTION OF SOME EMBODIMENTS

The following embodiments are only examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may also contain also features, structures, units, modules etc. that have not been specifically mentioned.

Embodiments are applicable to any base station, network element, user equipment (UE), server, corresponding component, and/or to any communication system or any combination of different communication systems that support required functionalities.

The protocols used, the specifications of communication systems, servers and user terminals, especially in wireless communication, develop rapidly. Such development may require extra changes to an embodiment. Therefore, all words and expressions should be interpreted broadly and they are intended to illustrate, not to restrict, embodiments.

Many different radio protocols to be used in communications systems exist. Some examples of different communication systems are the universal mobile telecommunications system (UMTS) radio access network (UTRAN or E-UTRAN), long term evolution (LTE®), known also as E-UTRA), long term evolution advanced (LTE-A®), Wireless Local Area Network (WLAN) based on IEEE 802.11 standard, worldwide interoperability for microwave access (WiMAX), Bluetooth®, personal communications services (PCS) and systems using ultra-wideband (UWB) technology. IEEE refers to the Institute of Electrical and Electronics Engineers. LTE and LTE-A are developed by the Third Generation Partnership Project 3GPP.

Figure 1:
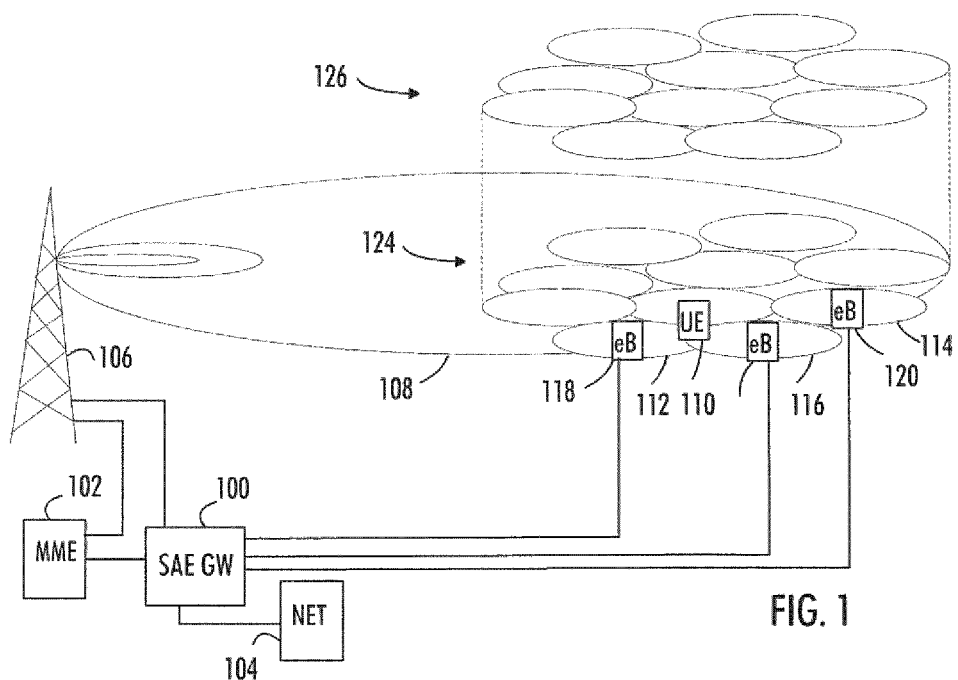

FIG. 1 illustrates a simplified view of a communication environment only showing some elements and functional entities, all being logical units whose implementation may differ from what is shown. The connections shown in FIG. 1 are logical connections; the actual physical connections may be different. It is apparent to a person skilled in the art that the systems also comprise other functions and structures. It should be appreciated that the functions, structures, elements and the protocols used in or for communication are irrelevant to the actual invention. Therefore, they need not to be discussed in more detail here.

In the example of FIG. 1, a radio system based on LTE/SAE (Long Term Evolution/System Architecture Evolution) network elements is shown. However, the embodiments described in these examples are not limited to the LTE/SAE radio systems but can also be implemented in other radio systems.

The simplified example of a network of FIG. 1 comprises a SAE Gateway (GW) 100 and an MME 102. The SAE Gateway 100 provides a connection to Internet (NET) 104. FIG. 1 shows a base station or an eNodeB 106 serving a cell 108. In this example, the eNodeB 106 is connected to the SAE Gateway 100 and the MME 102. In this example, the cell 108 is a macro cell and the eNodeB 106 is a macro cell node. The macro node 106 may be denoted as Macro eNodeB (MeNB).

In general, the eNodeBs (Enhanced node Bs) of a communication system may host the functions for Radio Resource Management: Radio Bearer Control, Radio Admission Control, Connection Mobility Control, Dynamic Resource Allocation (scheduling). The MME 102 (Mobility Management Entity) is responsible for the overall UE control in mobility, session/call and state management with assistance of the eNodeBs through which the UEs connect to the network. The SAE GW 100 is an entity configured to act as a gateway between the network and other parts of communication network such as the Internet for example. The SAE GW may be a combination of two gateways, a serving gateway (S-GW) and a packet data network gateway (PGW).

The eNodeB 106 may provide radio coverage to a cell 108. The cell 108 may be of any size or form, depending on the antenna system utilized. The eNodeB 106 may control a cellular radio communication link established between the eNodeB 106 and terminal devices or user equipment (UE)

110 located within the cell 108. The terminal device may be a user equipment of a cellular communication system, e.g. a personal computer (PC), a laptop, a hand held computer, a tablet, a mobile phone, or any other user terminal or user equipment capable of communicating with the cellular communication network.

In the example of FIG. 1, there are a set of small cells installed within the macro cell. Each small cell is served by a node. As an example, small cells 112, 114, 116 served by nodes 118, 120 and 122 are illustrated. The nodes 118, 120, 122 serving small cells may be denoted as local area base stations or eNodeBs (LAeNB) and they may form a small cell layer or a small cell cluster. In practice, the number of small cells may be considerable greater than three. The small cells may be connected to each other using an X2 interface, for example. There may also be an interface between the macro eNodeB and a small cell eNodeB. In some practical deployments, this interface is not close to an ideal interface (e.g. optical) but is an interface with notable delays due to the interface implementation technology, due to the limited capacity of the interface, due to the reliability properties of the link that can be achieved by introducing error correcting protocols over the transport link or due to the traffic characteristics that may make the link capacity insufficient in high activity time periods while being sufficient in silent times. Delivering packet traffic over such an interface may face queuing, delay and delay variation.

In an embodiment, the small cells operate on a separate frequency layer 126 which is dedicated for small cell deployment. The operation in small cell frequency layer may be controlled by the overlaying macro cell that provides the coverage in another frequency layer over coverage area of the small cells. The control relationship between macro and small cell layer may vary depending on the selected architecture. In an embodiment, the macro layer may provide common control information for the UEs operating in small cell layer.

In an embodiment, the small cells operate on the same frequency layer 124 as the overlaying macro cell. This is possible if for example building losses provide sufficient isolation, or if some coordination mechanism is applied.

One problem related to small cells relates to mobility. i.e the realization of handovers and serving cell changes on a small cell layer, so that they could be executed in a manner not having large impact to the macro cell layer nor to the core network interfaces. These issues appear significant, when the number or density of small cells is high in the macro coverage. These issues also appear significant, when the small cell mobility cannot be instantaneously controlled by the macro cell eNodeB due to large delay between the macro eNodeB and small cell eNodeB communications. The problem of frequent small cell changes is increasing dynamicity, managing resources dynamically and dimensioning the network interfaces. Further, the legacy handover procedure is heavy in signaling and unnecessarily slow for the frequent small cell changes, especially when there is a notable communication delay between the macro eNodeB and small cell eNodeBs. The small cell layer, in particular among a limited set of small cells can apply many relaxations to the small cell mobility functionality e.g. due to the possible opportunity of sharing information faster among the small cells compared to sharing information between the macro cell and a small cell.

In an embodiment, layered mobility is proposed to situations where UE has dual-connectivity to a macro cell layer and to a small cell layer. The small cell mobility may be handled independently of the macro cell mobility. The macro cell controls the UE and the macro layer mobility; whereas the small cell mobility without specific macro cell control may be limited to a set of small cells or to a small cell cluster.

The macro cell may control the UE in a manner having the UE's Access Stratum context, Evolved Packet System EPS context and security context stored. The macro cell is responsible for the UE's EPS connectivity, for the core network interfaces and for the EPS bearer management with the Evolved Packet Core (EPC). Small cells may be managed together in case they form a defined domain, scope and/or a service set (e.g. similar to Wi-Fi Service Set).

The management of small cell configurations may be realized by the macro eNodeB (MeNB) or by the small cells themselves, or by a network management entity. The first serving small cell of a cluster for a UE may be configured separately from the small cell neighbor configurations or if the neighborhood definition is clear, the small cell neighbor configurations can be appended to the serving small cell configuration. These configurations may set the UE from single connectivity to dual-connectivity, wherein the single connectivity has one serving cell either macro or a small cell whereas the dual-connectivity has serving macro cell and serving small cell having different functional roles for the served UE.

Separate from the macro network context, the UE's local small cell context can either be created by the MeNB or it may be created by the small cell cluster after the UE has small cell connectivity to the first serving small cell. The small cell UE context may be defined by the first (original) serving small cell, which can distribute the UE context at need to any one or more of its recognized small cell neighbors in the cluster. Alternatively, the small cell UE context may be created by a small cell management procedure (possibly involving a small cell management function) in the small cell network or it may be managed by the MeNB.

In an embodiment, separate cell-specific Radio Network Temporary identifiers (c-RNTI) for the different cell layers may be used. The macro cell c-RNTI behaves in the legacy way, where the identifier changes when the serving cell changes. In a small cell layer, the c-RNTI need not change at the change of serving small cells.

The cell specific Radio Network Temporary identifier (c-RNTI) is assigned by the MeNB for the UE served by a single macro cell. The c-RNTI changes at a time of serving macro cell changes by the legacy handover procedure.

The separate c-RNTI identification given for UE operation in a small cell cluster may be denoted as a small cell c-RNTI (sc-RNTI). The UE is able to receive its small cell resource allocations by the sc-RNTI, with the distinction to the legacy c-RNTI operation in that the sc-RNTI need not change at a serving small cell change. Keeping the sc-RNTI over the small cell changes allows the UE to initiate a cell change and it allows the UE to readily have the knowledge on the sc-RNTI valid for use of resource allocation in the target cell. In a small cell deployment, the consumption of identity space per small cell is possibly low per cell due to the small cell size (and due to low number of served UEs per cell), but a large identity space is needed over the area unit. As an example, the 16-bit space (of over 65000 identities) reserved by a macro cell for its served UEs is not needed in a single small cell, but the identity space of the same size (65000) can be reserved for the use of a set of small cells for their served UEs, yet radically increasing the usable identities per area unit compared to that of macro cell.

Occasionally the sc-RNTI of a UE may have to change, for example before a UE is entering a small cell, where its earlier assigned sc-RNTI is not valid (or free). This can be handled by a separate sc-RNTI change Information element included into a RRC message. This procedure has the benefit that it does not need to happen at a time of small cell handover, but it can take place while the UE is served in a small cell. An example of sc-RNTI change Information Element is given below;

```
sc-RNTI-Change {
    old sc-RNTI
    new sc-RNTI
    SFN
}
```

SFN denotes System Frame Number where the SFN for a new sc-RNTI becomes valid and old sc-RNTI becomes invalid, in the currently serving cell.

Another alternative works without SFN number but changes the signaled old sc-RNTI to a new sc-RNTI, the change of which becomes valid when the small cell eNB receives the sc-RNTI-ChangeResponse from the UE. The time of change may be in relation to the subframe index at the positive acknowledgement of the reception of sc-RNTI-ChangeResponse by the eNB from the UE (three-way handshake). The timing relations of the RRC-message, its acknowledgement and reception of the acknowledgement are known.

The UE receives the sc-RNTI for its operation in the small cell cluster when is establishing a connection to the small cell layer under a MeNB. In an embodiment, the sc-RNTI may be signaled to the UE by the MeNB. In another embodiment, the c-RNTIs may be decided and coordinated among the small cells and it may be signaled to the UE by the serving small cell. There are various way to coordinate the sc-RNTI. The sc-RNTI may be decided by a small cell support node, by an access controller or some other similar network node. The identities may also be decided by the serving small cell and let be propagated to the small cell neighbor cells in the small cell cluster, e.g. by connected X2 interfaces. The identities may also be conveyed to the small cells by the controlling MeNB. In an embodiment, the small cells are connected as a local cloud, which is capable of managing the identity sharing inside the cloud.

In an embodiment, a handover within a small cell cluster may be realized with a more streamlined implementation than in traditional RACH (Random Access Channel)-procedure. A UE desiring a handover may transmit a candidate target cell list to the serving small cell. The serving small cell is configured to send a response which allows or denies the UE to access one or more of the target cells in the network preferred priority order. Denial can be used to control mobility across small cell clusters. The UE accesses target cell selected from the allowed set by using the dedicated Scheduling Request SR resources, that are defined in a set of small cells. The SR resources may be defined using Radio Resource Control RRC signaling. In the prior art solutions, SR resources are defined in a serving cell only.

In an embodiment the Scheduling Request SR uses a dedicated Physical Uplink Control Channel PUCCH Format 1/1a/1b resource that is allocated by the source cell without the need of handover specific signaling with the target cells (thus differing from the allocation of conventional PRACH (Physical Random Access Channel) preamble).

In an embodiment, a cell-specific preallocation of cell access SR resources is utilized. Cell access SR resources are separated from the serving cell SR resources. In this embodiment, the network has defined in each cell a set of PUCCH Format 1 resources for SR based cell access for each of the neighbor cells in a small cell cluster area. In other words, in the event of a handover, a source cell has a set of pre-allocated PUCCH Format 1 resources on each neighboring target cell candidate. The source cell can then allocate to an UE a SR signal resource from the dedicated PUCCH Format 1 resources forming the set of pre-allocated resources in this target cell. The allocation to the UE is also temporal and expires after a predefined time or it may remain valid as long as the UE stays served by the same source cell. If the UE changes the serving cell, it will naturally get an updated assignment belonging to that source cell to its new neighboring target cells. As said above, UE has different cell access resources in different target cell candidates among the neighbor cells.

The UE, once having measured and selected the preferred and allowed target cell(s) knows in advance, what is the dedicated SR signal it may generate to access the target cell. PUCCH Format 1 resources allocated for cell access follow normal PUCCH Format 1 configuration, i.e., base sequence and cyclic shift hopping are determined according to the target cell Physical Cell Identity (PCI). As an alternative, the base sequence and cyclic shift hopping can be derived based on the virtual PCI that is signaled to the UE by the RRC-signalling. Thus the virtual PCI is especially used for the visited cell access. The UE is configured to receive the virtual-PCI for the access of a target cell. Alternatively, the UE may use the PCI value of its currently serving source cell as an assigned virtual PCI value in the target cell. Therefore the virtual-PCI can be common to the UEs accessing a target cell from the same source cell and it is different for the UEs accessing the target cell from another source cell. The virtual-PCI list in use for accessing neighboring cells in the small cell cluster may be advertised to the UE by the dedicated signaling from a serving source cell. The UE may only need this information once if the assignment of visited-PCIs is explicit and valid for the small cell cluster, and the list of updates are provided once available. Using a PCI of source sell as a virtual PCI of the target cell is the simplest solution and it does not increase interference, if the cell access resources and serving cell resources in the neighbors are different in time and frequency. If virtual-PCI assignment is explicit and given from the values outside of the PCI inside the small cell cluster, interference can also be reduced.

In an embodiment, a UE-specific allocation of cell access SR resources is utilized. In this embodiment, an UE is allocated a dedicated cell access SR resource on each cell within the small cell cluster. The cell access SR resource can use either PCI or virtual PCI as discussed above. When establishing a connection to the small cell layer under a MeNB the UE receives the sc-RNTI and a set of dedicated SR definitions for its operation in the small cell cluster. In an embodiment, the UE may be configured to store the information on the predetermined user equipment specific cell access resources for each cell. Similar mechanisms to manage dedicated SR resources can be used as for the sc-RNTI management.

In an embodiment, the parameters for cell access SR resource may be as below;

```
{
Target cell parameters{
    Target cell identity (PCI)
    Virtual-PCI for the cell access
}
UE-specific parameters {
    Virtual PCI for the cell access[ unless this is given by the target cell
parameters or derived from the source cell PCI]
    Visited-PUCCH resource index [used in defining PRB, OCC and
    cyclic shift]
    Visited-PUCCH config index [defining periodicity and subframe
    offset]
}
}
```

The above Information Element could be provided for the UE by dedicated signaling for a single target cell, for a set of target cells or for the cluster of target cells. In case of signalling for multiple cells, the Information Element may be repeated for every one of the target cells. Alternatively, PUCCH Common configuration could be included to the target cell parameters.

For an optimization, it is also possible that the target cell parameters are advertised by the RRC signaling commonly to UE, so that a UE may request the information about the visited resources of a target cell. In this case, the UE will get to know the virtual PCI per target cell and the visited-PUCCH resources per target cell; and for that specific target cell get the UE-specific parameters.

The SR multiplexing capacity of a PUCCH resource can be high; as small cell environment do not cause large delay spread or large delay differences for the accessing UEs. For this reason, cyclic shifts can be taken into use at high density, every second cyclic shift hence allowing 36 SR signals configured per Physical Resource Block PRB.

In small cells the PUCCH capacity is large as the bandwidth is typically large, there is a lower number of UEs per small cell and hence configuring more PUCCH resources is not as bad control overhead as in a large cell which may be fully loaded. Reserving PUCCH resources from a fractionally loaded cell does not have as negative impact, because the resource is available (being idle anyway) and a non-used PUCCH reserved for use does not create interference.

Figure 2:
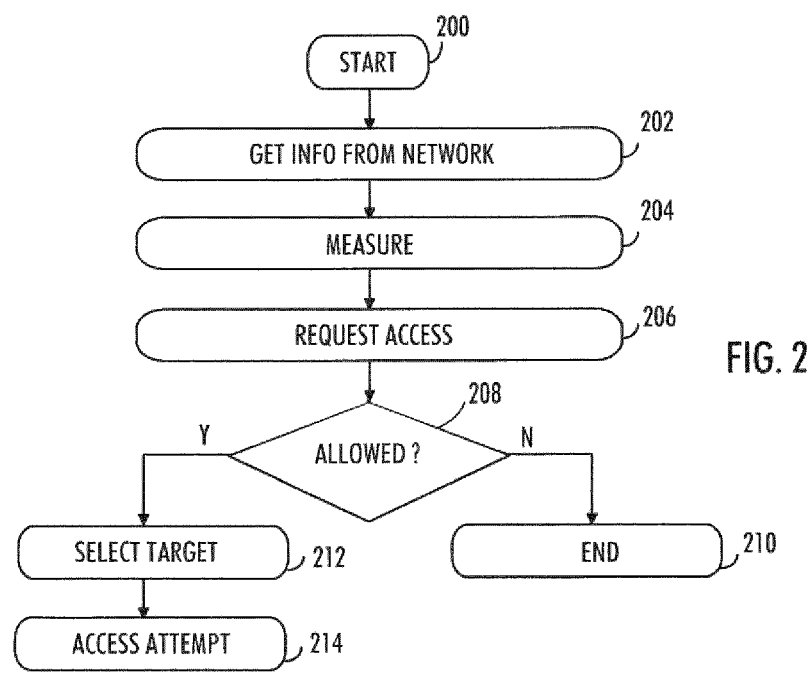
FIGS. 2, 3 and 4 are flowcharts illustrating embodiments of the invention.
Figure 3:
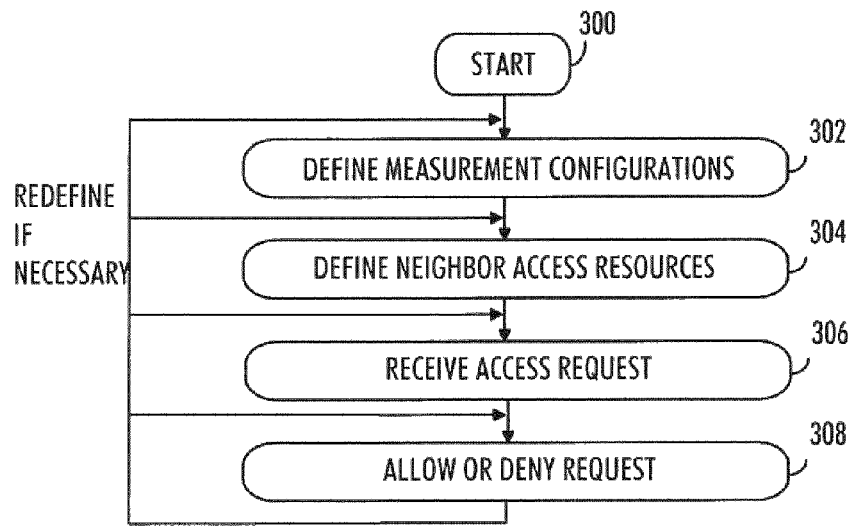
Figure 4:
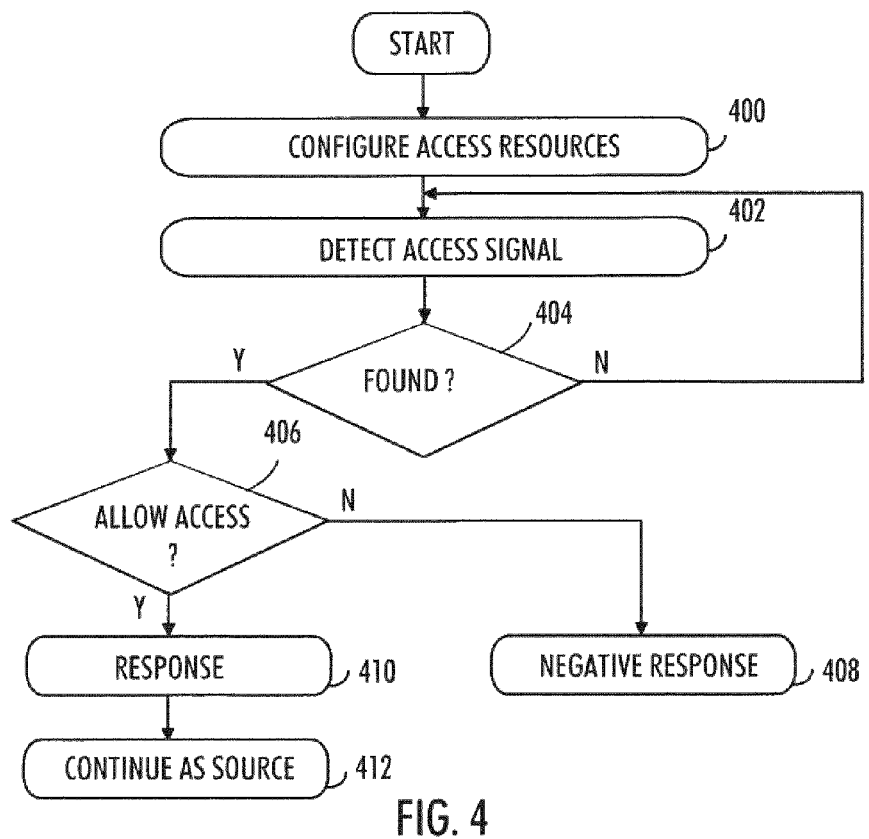

FIGS. 2, 3 and 4 are flowcharts illustrating embodiments of the invention. The flowcharts relate to the realization of a small cell handover (HO). FIG. 2 illustrates an example of the operation of a UE, FIG. 3 the operation of a source small cell and FIG. 4 the operation of a target small cell.

In FIG. 2, the UE receives measurement configuration or guidance end event triggers from the network in step 202. This information relates to the small cell configuration. The UE may have a separate connection with a macro cell having a first identity, i.e. c-RNTI related to the macro cell connection. In an embodiment, a second identity, i.e. sc-RNTI, is related to the small cell connection.

In step 204, the UE performs measurements and decides for a candidate target cell or a preference list of set of target small cells.

In step 206, the UE informs the candidate target cell or preference list of target cells to the currently serving small cell.

In step 208, the UE receives a response indicative of the allowed or preferred target cells by the small cell. If denied, the procedure ends 210. The serving small cell may deny the access to some of UE preferred target cell(s).

In step 212, the UE has received allowance or preference from the small cell and the UE is configured to select a target cell. The serving small cell may send a response to the request that allows the UE to access one or more of the target cells in the network preferred priority order. Response may contains SR resource allocation for the given target cells. The UE can select the target cell from the list of allowed target cells.

In step 214, the UE attempts the small cell handover by transmitting Scheduling Request to a target small cell utilizing the given SR resources.

FIG. 3 illustrates an example of the operation of a source small cell during a small cell handover.

In step 302, the small cell (SCeNB) may define measurement configuration or measurement guidance and event triggers for the UEs operation in small cell (other than those applicable in macro cell layer).

In step 304, the SCeNB may define neighbor small cell access resources PUCCH, SR which may be either UE specific or target cell specific.

In step 306, the SCeNB receives a request from a UE to access a target cell for a handover.

In step 308, the SCeNB responses the UE to allow or deny the requested access to a target cell for a handover.

In an embodiment, an access denial may be based on the network's knowledge on the target small cell not belonging to the small cell cluster, e.g. the target small cell not having a network interface to the serving MeNB. Other denials may be based on the serving small cell not being able to verify the feasibility of a target candidate or based on target cell load based e.g. on regular or event based load reporting among small cells. The reason for the denial may be included to the response.

For some of the reasons (target small cell does not belong to the small cell cluster; target cell access resource is not known), denial means that the UE cannot use the small cell HO method maintaining sc-RNTI (and using SR transmission to that target cell) but a normal LTE HO process may be triggered, for example based on random access. In other words, the embodiment provides MeNB a method to control handovers between small cell clusters and let SCeNB dominate in handovers inside the small cell clusters. One small cell cluster could include all small cells in connection to the same MeNB.

An example of the small cell change request and response;

```
Small cell change request {
List of target cells [physical cell identity, order in the UE
preference list]
}
Small cell change response {
List of target cell [physical cell identity, order in the eNodeB
preference list, allow/deny, reason ( ), access resource indication]
}
```

The SCeNB may be configured to redefine the configurations and access resources if needed.

FIG. 4 the operation of a target small cell during a small cell handover.

In step 400, the small cell (SCeNB) configures access resources such as PUCCH, SR for the UEs to make handover to this target cell. These access resources are separated from other resources such as serving cell PUCCH or random access resources.

In step 402, the SCeNB is configured to scan for an access request (Scheduling Request) from a UE in these access resources.

If not found in step 404, the process continues in step 402.

If found in step 404, the SCeNB is configured to allow or deny the access.

If denied, the SCeNB is configured to transmit a negative response to the UE in step 408.

If allowed, the SCeNB is configured to send a positive response to the UE in step 410. The SCeNB may response with an uplink allocation using the sc-RNTI of an embodiment of the invention.

In step 412, the SCeNB is configured to communicate with the UE and it may allocate resources using the sc-RNTI. The UE is configured to use the serving cell resources instead of the target cell access resources. The SCeNB may configure or reconfigure the serving cell resources, for example SR and PUCCH resources, for UE. This may be necessary, if these resources were not yet signaled from the source SCeNB to the UE.

The above described procedure of small cell selection is not a forward handover in a sense that the UE is not allowed to select a target cell autonomously but only from a list of network approved target cells. In case the UE has to execute a handover to a target cell, which is not allowed, the UE may use MeNB procedure or a random access procedure instead. These will cause notably long handover delay and more signaling over the air interface and over the network interfaces (X2 and MeNB/SCeNB interfaces) compared to the handover to the dedicated access resources according to the embodiments of the invention.

In an embodiment, the Scheduling Request SR mechanism is network controlled, because the UE may only do SR based access to a target cell where it has dedicated SR resources valid. The scheduling request signals for the target cell access resources, for example to a visited-PUCCH resources may be separated by different virtual cell identities from the UEs accessing from different neighbor cells, which generates pseudo-random behavior to the cyclic shift selection. In other words, UEs accessing a target cell from different neighbor source cells will use different sequence group or sequence group hopping pattern as well as different cyclic shift hopping. The SR signals for UEs accessing a common target cell from the same source cell inherently use different PUCCH resource index (for example cyclic shift) because these indexes are already coordinated by the source cell (for the source cell operation) and thus they are orthogonally separated by the different cyclic shifts. In addition these signals may be separated in the target cell by the orthogonal cover code OCC and/or PUCCH physical resource block PRB index from the UEs accessing this same target cell from another source cell.

As mentioned, the UEs accessing a target cell from different neighbor cells use SR transmission resources which may not be mutually orthogonal. However, even if this is valid for the resource reservation, the probability of actual use of SR signal in a PUCCH PRB for handover purposes is quite low if all UEs in a set of neighboring cells have a dedicated SR resource. Therefore, a tighter multiplexing configuration can be applied with a sufficiently high correct probability of SR detection.

Signal separation for the non-orthogonal SR transmissions may be provided by the base sequence hopping, which happens according to the pattern derived from the virtual PCI. Additional signal separation may be provided by the cyclic shift hopping, which also happens according to the pattern derived from the virtual PCI. Therefore, the false detection of cyclic shifts used by individual UEs accessing by different virtual PCI is further reduced.

The embodiments of the invention have advantages in the signaling overhead and latency at a time of small cell change in the dual-connectivity case. A UE having Scheduling Request sequences readily available for the access of any target cell of a small cell cluster allows the UE do a non-contention based access to any target cell without any other preparing actions than a request for the permission from a source cell. This omits RACH-procedure at the cell change, and the need for granting a new c-RNTI by the source cell acquiring it from the target cell. Heavy and frequent measurement reports can be made unnecessary, if UE can decide the target cell by itself based on the measurements without reporting the measurement results but just the target cell candidates. It is noteworthy that allocation of RACH resources for handover purposes consume in minimum 6 PRB per one RACH opportunity, which corresponds to (6*36) 216 SR resources or even more (6*72=432) if tighter cyclic shift mapping is applicable. In addition, RACH procedure has the disadvantage of risk of collision, unless a mechanism of dedicate preamble reservation is used. The dedicated preamble reservation however requires dynamic signaling and management of dedicated preamble use, because RACH sequence family is small and therefore the dedicated preamble reservation cannot be kept long These advantages are achievable in a small cell scenario with dual-connectivity, because they do not imply any changes to the legacy macro cell mobility.

Figure 5:
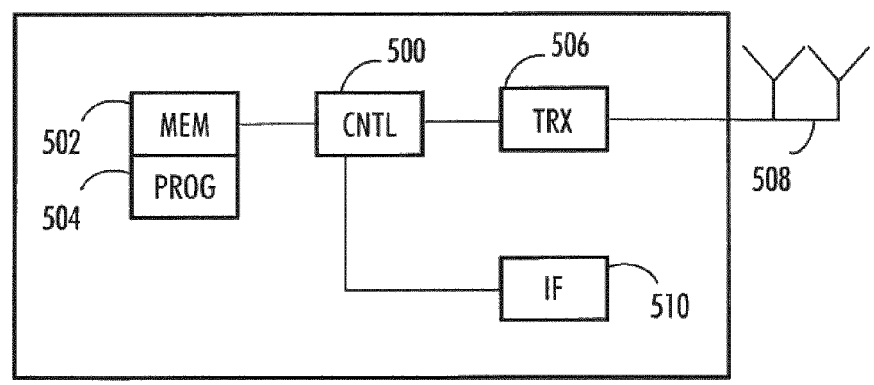
FIGS. 5 and 6 illustrate examples of apparatuses applying some embodiments of the invention.

FIG. 5 illustrates an embodiment. The figure illustrates a simplified example of an apparatus in which embodiments of the invention may be applied. In some embodiments, the apparatus may be a base station or eNodeB or a part of an eNodeB.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 500 configured to control at least part of the operation of the apparatus.

The apparatus may comprise a memory 502 for storing data. Furthermore the memory may store software 504 executable by the control circuitry 500. The memory may be integrated in the control circuitry.

The apparatus comprises a transceiver 506. The transceiver is operationally connected to the control circuitry 500. It may be connected to an antenna arrangement 508 comprising one more antenna elements or antennas.

The software 504 may comprise a computer program comprising program code means adapted to cause the control circuitry 500 of the apparatus to control the transceiver 506.

The apparatus may further comprise an interface 510 operationally connected to the control circuitry 500. The interface may connect the apparatus to other respective apparatuses such as eNodeB via X2 interface or to the core network. The apparatus may be a local area base station connected to other corresponding apparatuses forming a local area base station cluster.

The control circuitry 500 is configured to execute one or more applications. The applications may be stored in the memory 502.

In an embodiment, the applications may cause the apparatus to belong to a cluster of local area base stations; have a connection with user equipment having a first identity related to the connection; receive from the user equipment a request to send a scheduling request to another local area base station of the cluster, the request comprising a list of target candidate base stations; determine one or more suitable target base stations from list of target candidate base stations; determine resources for sending the scheduling request and transmit to the user equipment a response to the request, the response comprising one or more base stations of the list as allowed targets and information on resources for sending the scheduling request to the second local area base station.

In an embodiment, the applications may cause the apparatus to belong to a cluster of local area base stations; receive a scheduling request from user equipment connected to another local area base station belonging to the cluster, the connection being related to a given identity; allocate communication resources to the user equipment and start communicating with the user equipment associating the given identity to the connection with the user equipment.

Figure 6:
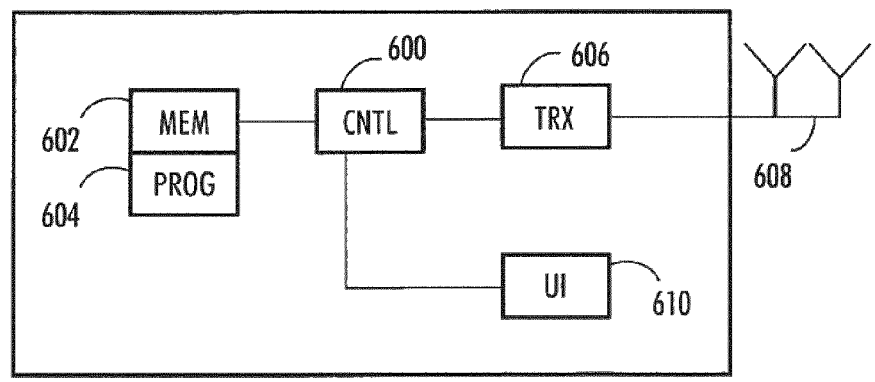

FIG. 6 illustrates an embodiment. The figure illustrates a simplified example of an apparatus in which embodiments of the invention may be applied. In some embodiments, the apparatus may be user equipment or a part of user equipment.

It should be understood that the apparatus is depicted herein as an example illustrating some embodiments. It is apparent to a person skilled in the art that the apparatus may also comprise other functions and/or structures and not all described functions and structures are required. Although the apparatus has been depicted as one entity, different modules and memory may be implemented in one or more physical or logical entities.

The apparatus of the example includes a control circuitry 600 configured to control at least part of the operation of the apparatus.

The apparatus may comprise a memory 602 for storing data. Furthermore the memory may store software 604 executable by the control circuitry 600. The memory may be integrated in the control circuitry.

The apparatus comprises a transceiver 606. The transceiver is operationally connected to the control circuitry 600. It may be connected to an antenna arrangement 608 comprising one more antenna elements or antennas.

The software 604 may comprise a computer program comprising program code means adapted to cause the control circuitry 600 of the apparatus to control the transceiver 606.

The apparatus may further comprise user interface 610 operationally connected to the control circuitry 600. The user interface may comprise a display which may be touch sensitive, a keyboard, a microphone and a speaker, for example.

The control circuitry 600 is configured to execute one or more applications. The applications may be stored in the memory 602.

In an embodiment, the applications may cause the apparatus to have a first connection with a base station serving a macro cell and a second connection with a first local area base station belonging to a cluster of local area base stations; have a first identity related to the first connection and a second identity related to the second connection; transmit a scheduling request to a second local area base station belonging to the cluster; and communicate with the second local area base station after receiving a response from the second local area base station and associating the second identity to the connection with the second local area base station.

Figure 7:
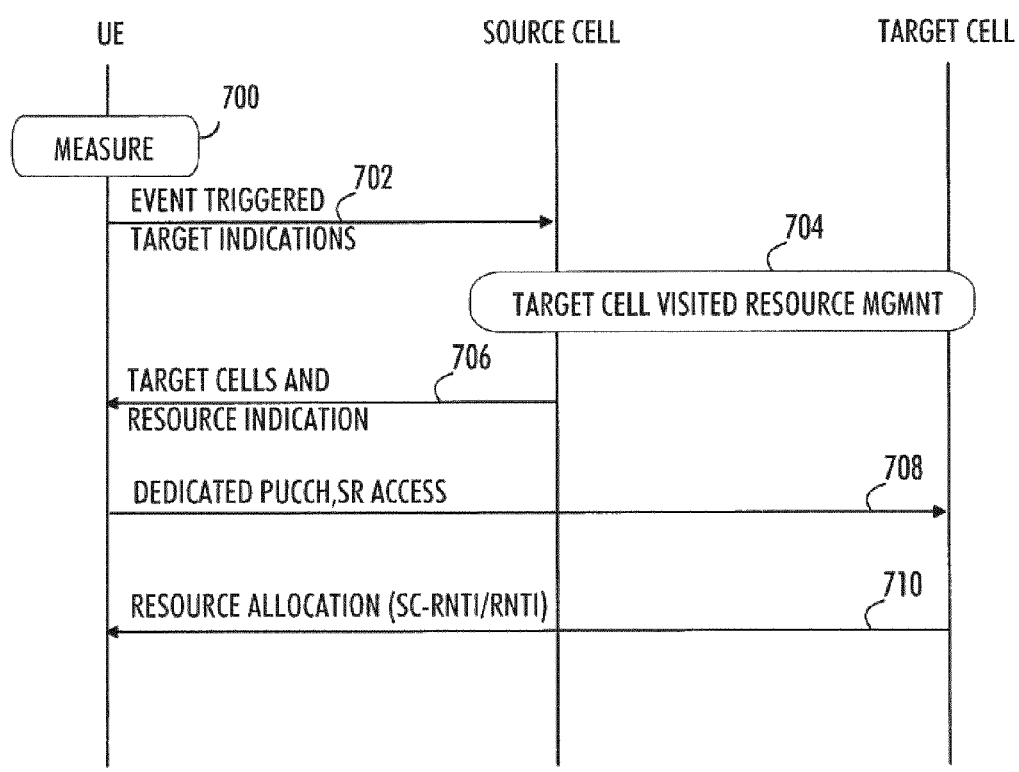
FIG. 7 is a signalling chart illustrating an embodiment of the invention.

FIG. 7 is a signalling chart illustrating an embodiment of the invention. The figure illustrates an example of the target cell access by dedicated signalling between UE, a source cell and a target cell.

In step 700, the UE performs measurements and decides for a candidate target cell or a preference list of set of target small cells.

Then, the UE sends a message 702 to the currently serving small cell indicating the candidate target cell or preference list of target cells.

Next, in step 704 the target cell access resources are determined. The resources may comprise visited PUCCH resources, RNTI and virtual PCI.

There are different ways how source cell can form these parameters. These may be readily configured to the cells of the small cell cluster, in case of which all cells in a cluster may be aware of the parameters in use in all cells of the cluster (from the small cell configuration stage), or the source cell may have to ask from a target cell candidate for the specific configuration in use thereof (but without a macro cell involvement which would be much slower than the small cell negotiation), or the source cell may get this information from a local cell management software, from a local cloud, or from a local domain support node, for example.

The source cell sends a response 706 to the UE. The response may comprise Accepted target cell(s) and resource indication. The message may comprise physical cell identity PCI, order in the eNB preference list, allow/deny, reason, SR access resource indication, for example. The visited PUCCH resources, RNTI, virtual-PCI can be given in the target cell indication message, unless these are known otherwise. In some embodiments Visited-PUCCH may be known from the small cell configurations, RNTI may be known as already signaled sc-RNTI that is valid in the small cell cluster, virtual-PCI may be derived from the source cell PCI.

The UE transmits Scheduling Request 708 to a target small cell utilizing the given resources.

The target cell sends in this example a positive response 710. The target cell may response with an uplink allocation using the sc-RNTI.

The steps and related functions described in the above and attached figures are in no absolute chronological order, and some of the steps may be performed simultaneously or in an order differing from the given one. Other functions can also be executed between the steps or within the steps. Some of the steps can also be left out or replaced with a corresponding step.

The apparatuses or controllers able to perform the above-described steps may be implemented as an electronic digital computer, or a circuitry which may comprise a working memory (RAM), a central processing unit (CPU), and a system clock. The CPU may comprise a set of registers, an arithmetic logic unit, and a controller. The controller or the circuitry is controlled by a sequence of program instructions transferred to the CPU from the RAM. The controller may contain a number of microinstructions for basic operations. The implementation of microinstructions may vary depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

An embodiment provides a computer program embodied on a distribution medium, comprising program instructions which, when loaded into an electronic apparatus, are configured to control the apparatus to execute the embodiments described above.

The computer program may be in source code form, object code form, or in some intermediate form, and it may be stored in some sort of carrier, which may be any entity or device capable of carrying the program. Such carriers include a record medium, computer memory, read-only memory, and a software distribution package, for example. Depending on the processing power needed, the computer program may be executed in a single electronic digital computer or it may be distributed amongst a number of computers.

The apparatus may also be implemented as one or more integrated circuits, such as application-specific integrated circuits ASIC. Other hardware embodiments are also feasible, such as a circuit built of separate logic components. A hybrid of these different implementations is also feasible. When selecting the method of implementation, a person skilled in the art will consider the requirements set for the size and power consumption of the apparatus, the necessary processing capacity, production costs, and production volumes, for example.

It will be obvious to a person skilled in the art that, as technology advances, the inventive concept can be implemented in various ways. The invention and its embodiments are not limited to the examples described above but may vary within the scope of the claim.

The invention claimed is:

1. An apparatus, comprising:
   at least one processor; and
   at least one memory including computer program code,
   the at least one memory and the computer program code configured to, with the at least one processor, cause the apparatus at least to:
   have a first connection with a base station serving a macro cell and a second connection with a first local area base station belonging local area base stations providing a small cell cluster;
   have a first identity related to the first connection and a second identity related to the second connection;
   transmit to the first local area base station a request for resources to send a scheduling request to another local area base station, wherein the request comprises a list of target candidates;
   receive from the first local area base station a response to the request, the response comprising one or more allowed targets from the list and information on resources for sending the scheduling request to at least an allowed target of the one or more targets;
   transmit the scheduling request to a second local area base station of the allowed targets, the transmitting using resources for the second local area base station indicated in the response; and
   communicate with the second local area base station and associate the second identity to the connection with the second local area base station.

2. The apparatus of claim 1, further configured to
   select one of the allowed targets as the target for request of the resources for the scheduling request and as the second local area base station; and
   transmit the scheduling request to the selected second local area base station utilizing the scheduling request resources received from the first local area base station.

3. The apparatus of claim 1, further configured to
   transmit to the second local area base station information on the second identity.

4. An apparatus in a base station, comprising:
   at least one processor; and
   at least one memory including computer program code,
   the at least one memory and the computer program code configured to, with the at least one processor, cause the apparatus at least to:
   belong to a cluster of local area base stations;
   have a connection with user equipment having a first identity related to the connection;
   receive from the user equipment a request to send a scheduling request to another local area base station of the cluster, the request comprising a list of target candidate base stations;
   determine one or more suitable target base stations from the list of target candidate base stations;
   determine resources for sending the scheduling request to the one or more suitable target base stations;
   transmit to the user equipment a response to the request, the response comprising the one or more suitable target base stations of the list as allowed targets and comprising indications of the resources.

5. The apparatus of claim 4, further configured to transmit information on the first identity to other base stations of the cluster.

6. The apparatus of claim 4, configured to select the resources for sending the scheduling request from a set of predetermined cell-specific scheduling request resources stored in the apparatus.

7. An apparatus in a base station, comprising:
   at least one processor; and
   at least one memory including computer program code,
   the at least one memory and the computer program code configured to, with the at least one processor, cause the apparatus at least to:
   belong to local area base stations providing a small cell cluster;
   determine, responsive to communication with another local area base station in the cluster, resources that can be used by a user equipment to communicate with the base station for a scheduling request and communicating indication of the determined resources to the other local area base station;

receive a scheduling request from user equipment connected to the other local area base station belonging to the cluster, the connection being related to a given identity, the scheduling request from the user equipment using the determined resources previously communicated to the other local area base station;

allocate communication resources to the user equipment; and start communicating with the user equipment and associating the given identity to the connection with the user equipment.

8. A method, comprising:

having a first connection with a base station serving a macro cell and a second connection with a first local area base station belonging to a cluster of local area base stations providing a small cell cluster;

having a first identity related to the first connection and a second identity related to the second connection;

transmitting to the first local area base station a request for resources to send a scheduling request to another local area base station, wherein the request comprises a list of target candidates;

receiving from the first local area base station a response to the request, the response comprising one or more allowed targets from the list and information on resources for sending the scheduling request to at least an allowed target of the one or more targets;

transmitting the scheduling request to a second local area base station of the allowed targets, the transmitting using resources for the second local area base station indicated in the response and communicating with the second local area base station and associating the second identity to the connection with the second local area base station.

9. The method of claim 8, further comprising selecting one of the allowed targets as the target for request of the resources for the scheduling request and as the second local area base station; and transmitting the scheduling request to the selected second local area base station utilizing scheduling request resources received from the first local area base station.

10. The method of claim 8, further comprising transmitting the second local area base station information on the second identity.

11. A non-transitory computer readable storage medium readable by a computer and comprising program instructions which, when loaded into an apparatus, cause the apparatus to execute the method according to claim 8.

12. A method in a base station, comprising:

belonging to a cluster of local area base stations;

having a connection with user equipment having a first identity related to the connection;

receiving from the user equipment a request to send a scheduling request to another local area base station of the cluster, the request comprising a list of target candidate base stations;

determining one or more suitable target base stations from the list of target candidate base stations;

determining resources for sending the scheduling request to the one or more suitable target base stations;

transmitting to the user equipment a response to the request, the response comprising the one or more suitable target base stations of the list as allowed targets and comprising indications of the resources.

13. The method of claim 12, further comprising: transmitting information on the first identity to other base stations of the cluster.

14. The method of claim 12, further comprising: selecting the resources for sending the scheduling request from a set of predetermined cell-specific scheduling request resources stored in the apparatus.

15. A non-transitory computer readable storage medium readable by a computer and comprising program instructions which, when loaded into an apparatus, cause the apparatus to execute the method according to claim 12.

16. A method in a base station, comprising:

belonging to a cluster of local area base stations;

determining, responsive to communication with another local area base station in the cluster, resources that can be used by a user equipment to communicate with the base station for a scheduling request and communicating indication of the determined resources to the other local area base station;

receiving a scheduling request from user equipment connected to the other local area base station belonging to the cluster, the connection being related to a given identity, the scheduling request from the user equipment using the determined resources previously communicated to the other local area base station;

allocating communication resources to the user equipment;

initializing communicating with the user equipment and associating the given identity to the connection with the user equipment.

17. A non-transitory computer readable storage medium readable by a computer and comprising program instructions which, when loaded into an apparatus, cause the apparatus to execute the method according to claim 16.

* * * * *